Sept. 15, 1925.
J. H. HAMMOND, JR
1,553,687
MEANS FOR CAUSING A DIRIGIBLE BODY TO FOLLOW A PREDETERMINED CURVE
Original Filed Aug. 11, 1920  2 Sheets-Sheet 1
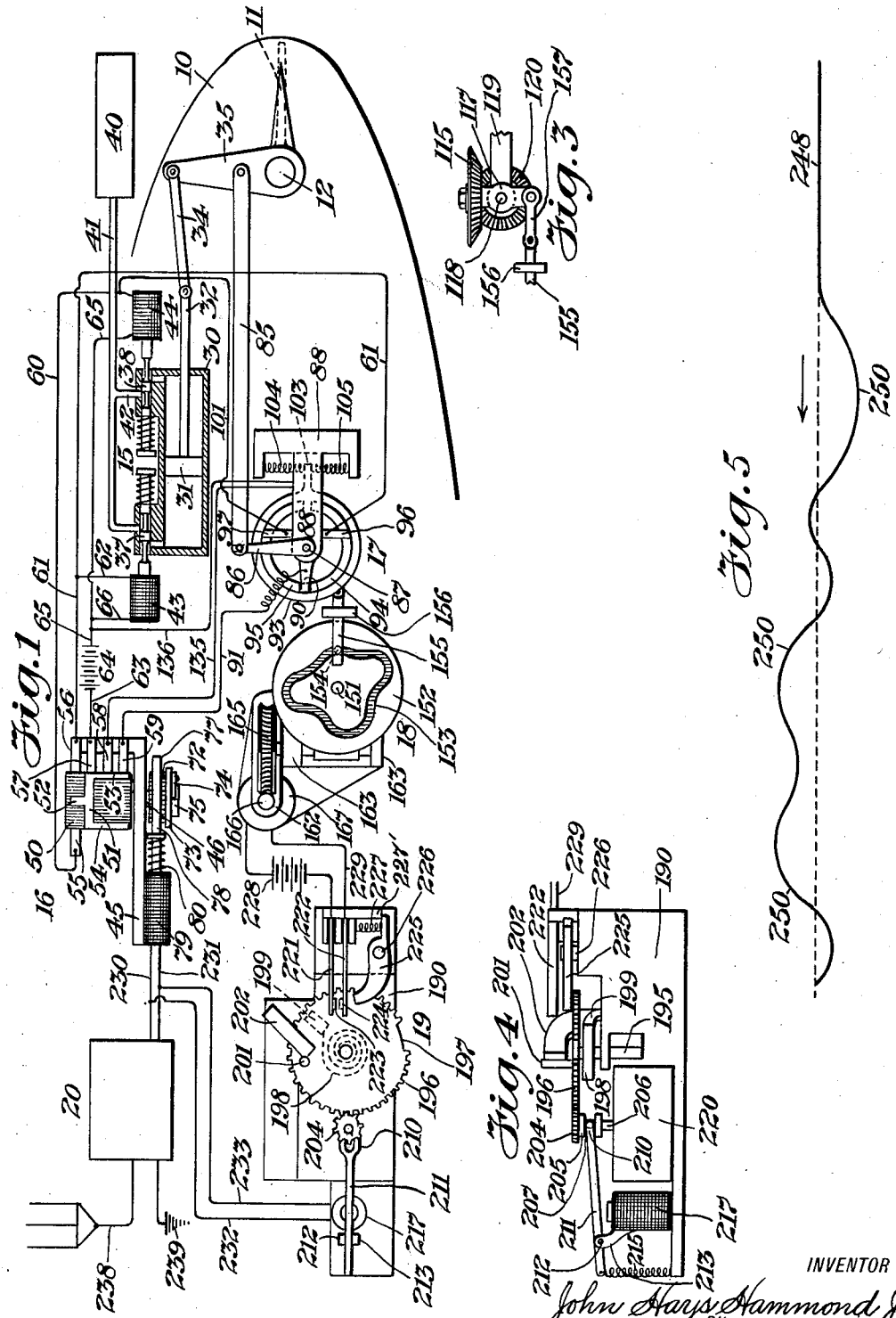
INVENTOR
John Hays Hammond Jr.,
BY
A. L. Gardner
HIS ATTORNEY

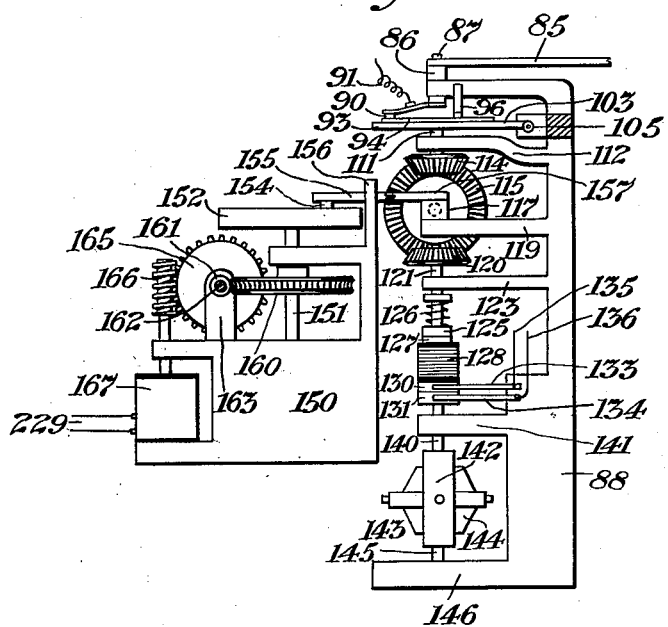

Patented Sept. 15, 1925.

1,553,687

UNITED STATES PATENT OFFICE.

JOHN HAYS HAMMOND, JR., OF GLOUCESTER, MASSACHUSETTS.

MEANS FOR CAUSING A DIRIGIBLE BODY TO FOLLOW A PREDETERMINED CURVE.

Application filed August 11, 1920, Serial No. 402,895. Renewed November 29, 1924.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Means for Causing a Dirigible Body to Follow a Predetermined Curve, of which the following is a specification.

Some of the objects of the present invention are to provide means whereby a movable body, such as torpedo or other dirigible body, may be caused to deviate from its course and follow a predetermined curve or an irregular predetermined course; to provide automatic means for causing a movable body to follow a predetermined course while subject to direction control at will from a distance; and to provide other improvements as will hereinafter appear.

In the accompanying drawings Fig. 1 is a plan view of one form of mechanism constructed in accordance with this invention; Fig. 2 is a fragmentary side elevation of part of this mechanism; Fig. 3 is a fragmentary plan view of part of the mechanism shown in Fig. 2; Fig. 4 is a side elevation of part of the mechanism shown in Fig. 1; and Fig. 5 is a diagrammatic representation of one course which the movable body may be caused to follow while under the control of the means constructed in accordance with this invention.

In the accompanying drawings, one embodiment of this invention comprises an improved system which is shown as mounted upon a torpedo or other dirigible body 10, provided with a rudder 11 rigid with a rudder post 12 arranged to oscillate about a substantially vertical axis fixed with respect to the body 10, and also provided with any suitable propelling means (not shown).

This improved system comprises fluid actuated electrically controlled mechanism 15 for controlling the rudder 11; an electrical distribution device 16 for controlling the fluid actuated mechanism 15, stabilizing means 17 for automatically controlling the rudder 11, automatically operative course or direction varying means 18 for causing the body 10 to proceed upon an irregular predetermined course, timing means 19 for controlling the course varying means 18, and radio receiving means 20 arranged to selectively control the entire system.

The fluid actuated electrically controlled mechanism 15 comprises a fixed cylinder 30, provided with a piston 31 to which is rigidly attached a piston rod 32. This piston rod 32 is connected by a link 34 to the end of a rudder arm 35 which is rigidly secured to the rudder shaft 12. The cylinder 30 is provided with two electrically controlled valves 37 and 38 which control the supply of fluid under pressure which flows from a tank 40 through a pipe 41 and branch pipe 42 to the valves 37 and 38 respectively. The valve 37 is operated by a solenoid 43 and the valve 38 is operated by a solenoid 44, these two solenoids being controlled through the electrical distribution device 16 as will appear hereinafter.

The electrical distribution device 16 comprises a fixed base 45 which supports a shaft 46 which extends through the base and which is arranged to rotate about a fixed axis. Surrounding and rigidly secured to the shaft 46 is a cylindrical commutator 50 made of any suitable insulating material and provided with a continuous circumferential conducting ring 51 provided with three segmental extensions 52, 53 and 54 spaced at intervals of 90 degrees. Five fixed brushes 55, 56, 57, 58 and 59 are secured in suitable positions to co-operate with the commutator 50, one of these brushes 57 being in engagement at all times with the ring 51, two, 55 and 56 being diametrically opposed and arranged to be engaged alternately by the segment 52, and the remaining two brushes 58 and 59 being arranged to engage simultaneously either the segment 53 or the diametrically opposed segment 54 depending upon the position of the commutator. The brush 55 is connected by a conductor 60 to the right hand end of the winding of the right hand solenoid 44, and the diametrically opposed brush 56 is connected by a conductor 61 and branch conductor 62 to the corresponding end of the winding of the left hand solenoid 43. The brush 57 of the ring 51 is connected by a conductor 63 to one pole of a battery 64 the other pole of which is connected by a conductor 65 and branch conductor 66 to the left hand ends respectively of the windings of the two solenoids 44, 43. The other two brushes 58 and 59 are connected to control the solenoids 43, 44, through the stabilizing means 17 as will appear hereinafter.

For rotating the commutator 50 step by step in one direction at the will of the operator, a gear 72 is mounted loosely upon the shaft 46 and carries a plate 73 which is provided with a spring pressed pawl 74. This pawl engages a ratchet 75 which is rigidly secured to the outer end of the shaft 46. The gear 72 meshes with a rack 77 cut on one end of a rod 78, the other end of which forms the core of a solenoid 79. A spring 80 is provided which normally keeps the rod 78 in the position shown in Fig. 1.

The stabilizing means 17 for automatically maintaining the body upon a predetermined course, comprises a link 85 one end of which is connected to the rudder arm 35, while the other end of this rod is pivoted to an arm 86. The arm 86 is rigidly secured to a substantially vertical shaft 87 which is rotatably supported in a bearing in a fixed rigid frame 88 and carries on its lower end but insulated therefrom a contact arm 90. This arm is electrically connected by a wire 91 to the brush 59. Cooperating with the arm 90 is a disc of insulating material 93 which carries two concentric semi-circular conducting segments 94, 95. Two brushes 96 and 97 are secured to but insulated from the frame 88 and engage the segments 94 and 95, respectively. The brush 96 is connected to the hereinbefore mentioned conductor 61, and the brush 97 is connected by a branch conductor 101 to the hereinbefore mentioned conductor 60. The disc 93 is provided with an arm 103 which is held in a central position by means of springs 104, 105, which are attached to projections of the frame 88. The disc 93 is supported on a shaft 111 coaxially with the shaft 87 and which is rotatably carried by a fixed arm 112 of the frame 88. To the lower end of the shaft 111 is rigidly secured a beveled pinion 114 which meshes with a beveled gear 115 which is loosely mounted to rotate about an axis perpendicular to the axis of rotation of the pinion 114 upon a substantially horizontal arm 117 arranged to swing about a substantially vertical pivot 118 coaxial with the shaft 111 and rigidly secured to and projecting upwardly from an arm 119 rigid with the frame 88. The beveled gear 115 meshes with a beveled pinion 120 which is fixed on one end of a vertical shaft 121 coaxial with the shaft 111 and pivot 118 and rotatively mounted in bearings in an arm 123 rigid with the frame 88. Suitably connected to the lower end of the shaft 121 is one member 125 of a friction clutch. This member is slidable longitudinally of the shaft 121, but is held against rotation with respect thereto. A spring 126 normally holds the member 125 out of engagement with the other member 127 of the friction clutch. The lower clutch member 127 forms the upper end of a core of an electro-magnet 128, the ends of the winding of which are connected to slip rings 130, 131. Two brushes 133, 134 are secured to but insulated from the frame 88 and engage the slip rings 130, 131 respectively and are respectively connected by two conductors 135 and 136 to the brush 58 and the conductor 65 respectively. The electro-magnet 128 and the two slip rings 130 and 131 are fixedly secured to a shaft 140 rotatably mounted in a bracket 141 rigid with the frame 88. For holding the shaft 140 against rotation in space the lower end of the shaft is secured to a vertical gimbal ring 142 of a gyroscope 143 having a rotor 144 arranged to be rotated by any well known or suitable means about a normally substantially horizontal axis. The lower end of the gimbal ring 142 is rotatably supported by a vertical shaft 145 rotatably carried by a base 146 rigid with the frame 88.

For automatically causing the dirigible body 10 to proceed upon an irregular predetermined course, the course varying means 18 comprises a fixed rigid frame 150 rotatably supported by which and extending upwardly therefrom is a vertical shaft 151. Secured to the upper end of this shaft 151 is a substantially horizontal cam disc 152 provided in its upper surface with an irregular cam groove 153 of any desired shape, and slidably engaging in this groove 153 is a pin 154 carried by and depending downwardly from a horizontal bar 155 rectangular in cross section and extending snugly but slidably through a fixed bearing 156 rigid with the frame 150, the bar being free to be reciprocated longitudinally under the action of the cam 152 and pin 154 but being held against rotation. Pivotally connected to the outer end of the bar 155 is one end of a connecting rod 157 the other end of which is pivotally connected to the free end of the arm 117.

For rotating the cam 152 a worm gear 160 surrounds and is rigidly secured to the shaft 151 and is engaged by a horizontal worm 161 fixed on a shaft 162 arranged to rotate in bearings 163 fixed on the frame 150. Secured to one end of the shaft 162 is a worm gear 165 rotated by a vertical worm 166 rotated by a constant speed electric motor 167 arranged to be energized as will appear hereinafter.

For controlling the course varying means 18 just described, the timing means 19 comprises a fixed base 190 which rotatably supports a vertical shaft 195 which has fixed upon its upper end a gear wheel 196 provided with a mutilated segment 197. To the shaft 195 is secured one end of a spiral spring 198, the other end of which is secured to a projection 199 of the base 190. This spring tends to rotate the gear 196 in a clockwise direction as seen in Fig. 1. The gear 196 carries a pin 201 of insulating material which is normally held against a fixed stop 202 by means of the spring 198. Meshing with the gear 196 is a pinion 204 which is carried by a sleeve 205 which is arranged to slide longitudinally of a vertical rotary shaft 206, but is held against rotation with respect thereto. The sleeve 205 is provided with an annular groove 207 in which engages a yoke 210 on the end of an arm 211. This arm is pivoted at 212 to a support 213, and is held in the position shown in Fig. 4 by means of a spring 215. The support 213 is carried by an electro-magnet 217. The shaft 206 is continually rotated at a predetermined speed by means of a clock-work mechanism 220 of any well known or suitable construction which is carried by the frame 190. This speed may be varied by the usual or any suitable means.

Secured to the base 190 of the timing means 19, but insulated therefrom are two spring conducting arms 221 and 222 which have free ends projecting over the gear 196 and into the path of the pin 201, and provided respectively with two contact points 223 and 224. A pawl 225 is mounted to oscillate about a pivot 226 fixed on the base 190 and is normally held yieldingly in a fixed position as shown in Fig. 1 by means of a spring 227 with one end of the pawl against a fixed stop 227' and the other end of the pawl projecting into the path of the pin 201. One of the spring arms 221 is electrically connected through a battery 228 to one terminal of the motor 167 and the other arm 222 is connected by a conductor 229 to the other terminal of the motor 167.

For controlling the movable body from a distance by radiant energy, the solenoid 79 of the electrical distribution device 16 is connected to the radio receiving means 20 by two wires 230, 231, and the two ends of the winding of the electro-magnet 217 of the timing means 19 are connected to conductors 232, 233, which are connected to the conductors 230, 231 respectively. The radio receiving means 20 may be of any well known or suitable construction and is shown as provided with the usual antenna 238 and ground 239.

In the operation of the form of this invention, shown in the drawings, the dirigible body 10 normally proceeds on an approximately straight course 248, Fig. 5, under the control of the gyroscope 143, the various parts of the system being normally in the positions shown in Fig. 1. If while under the control of the gyroscope the movable body should deviate from the predetermined course to the left, the gyroscope 143 by holding the shaft 140 against rotation in space would cause the beveled pinion 120 to be rotated with respect to the dirigible body 10 in a clockwise direction as viewed in Fig. 1. This would turn the beveled pinion 114 in a counter-clockwise direction by means of the beveled gear 115, thus rotating the disc 93 in a counter-clockwise direction, which would bring the segment 95 into engagement with contact arm 90, thus closing the circuit through the solenoid 44 which operates the valve 38, thus allowing compressed air to enter the right hand side of cylinder 30, thus moving the piston 31 to the left and turning the rudder 11 in a counter-clockwise direction or to the right. This moves the link 85 to the left as viewed in Fig. 1, which, by means of the arm 86, rotates the contact arm 90 in a counter-clockwise direction until it rests on the insulation between the segments 94 and 95, at which time the solenoid 44 will be de-energized and the rudder 11 left in this position which returns the movable body 10 to its predetermined course. The rudder arm 35 being pivotally connected by the link 85 to the arm 86 of the stabilizing means 17, the rudder 11 therefore, under ordinary conditions of operation and while the movable body is not being rotated under the action of the course varying means 18, is always moved through an arc which bears a substantially fixed ratio to the arc through which the movable body has been diverted from its predetermined course. If while under the control of the gyroscope 143 the dirigible body 10 should deviate to the right, the disc 93 will be moved in a clockwise direction and the segment 94 will make contact with the arm 90, thus closing the circuit through the solenoid 43 which operates the valve 37, thus allowing compressed air to enter the left side of cylinder 30, thus turning the rudder 11 to the left that is to say in a clockwise direction as viewed in Fig. 1, which returns the dirigible body 10 to the predetermined course.

If now it should be desired to steer the dirigible body 10 to the right, an impulse of radiant energy is sent by a suitable distant transmitting apparatus—not shown— and this impulse acts through the receiving antenna 238 to operate the wireless receiving apparatus 20 which consequently energizes the solenoid 79, thus moving the rack 77 to the left which rotates the gear 72 a quarter of a revolution, which, by means of the pawl 74 and the ratchet 75, rotates the commutator 50 through a quarter revolution. This breaks the circuit through the brushes 58 and 59. The circuit through the electro-magnet clutch 127, 128 which is controlled by the brush 58, is, therefore, broken, and the magnet 128 de-energized, thus allowing the upper clutch member 125 to be moved upward under the action of the spring 126, thus freeing the shaft 121 from the gyroscope 143. The insulating disc 93 will, therefore, be returned to a central position under the action of the springs 104 and 105. The circuit through the contact arm 90, which is controlled by the brush 59, is therefore broken so that the stabilizing means 17 is rendered inoperative to control the dirigible body. A circuit is closed from the battery 64 through the brush 57, contact ring 51 and segment 52, brush 55, conductor 60, solenoid 44, and conductor 65, to energize the solenoid 44 which operates the valve 38, thus allowing compressed air to flow from the container 40 into the right side of the cylinder 30, thus moving the piston 31 to the left and turning the rudder 11 to the right which steers the movable body 10 to the right.

This steering to the right continues until another impulse is received by the antenna 238 which operates the wireless receiving apparatus 20 and energizes the solenoid 79 to rotate the commutator 50 through an additional quarter revolution. This breaks the circuit to the brush 55, thus de-energizing the solenoid 44 and closes the circuit to the brushes 58 and 59. This closes the circuit through the electro-magnet clutch 128 which pulls down the clutch member 125 and locks the shaft 121 to the gyroscope 143. The circuit is also closed through the arm 90 so that the stabilizing means 17 will be again operative to control the moving body 10 as previously described.

A third impulse of radiant energy now transmitted will turn the commutator 50 through an additional quarter revolution, thus making the stabilizing means 17 inoperative as previously described to control the dirigible body, and closing the circuit to the brush 56, which energizes the solenoid 43 thus allowing compressed air to enter the left side of cylinder 30 which turns the rudder 11 to the left, thus steering the movable body to the left.

A fourth impulse now transmitted will turn the commutator 50 through an additional quarter revolution to the position shown in Fig. 1, thus de-energizing the solenoid 43 and placing the movable body 10 under the control of the stabilizing means 17.

When the movable body is started upon its course, the timing means 19 is started and the gear 196 is consequently started to rotate in a counter-clockwise direction at a predetermined rate under the action of the time mechanism 220. When an impulse of radiant energy is received on the antenna 238 the electro-magnet 217 is energized, thus pulling the arm 211 down which moves the pinion 204 out of mesh with the gear 196, thus allowing this gear 196 to return to its initial position under the action of the spiral spring 198. Thus each time an impulse is sent the gear 196 is re-set in its initial position. If no impulse is received, however, for a certain predetermined length of time the pin 201 will have been moved around so that it will bend the flexible arm 222, thus moving the contact point 224 into engagement with the contact point 223 and the gear wheel 196 will be prevented from returning by means of the pawl 225 which locks the pin 201 in that position. The clock mechanism 220 will now no longer drive the gear 196, as the pinion 204 will be opposite the mutilated segment 197 of the gear 196. The circuit of the motor 167 will, therefore, be closed and the motor will start rotating, which, by means of the worm 166 and wheel 165, the worm 161 and wheel 160 will rotate the cam disc 152 at a predetermined rate. As the cam disc 152 rotates, the pin 154 sliding in the cam slot 153 will cause the bar 155 to move back and forth thus turning the arm 117 which carries the beveled gear 115. This causes the beveled pinion 114 to rotate, with respect to the position it would have been in had the arm 117 remained stationary, through certain predetermined arcs, and at a rate which is determined by the shape of the cam groove 153. The disc 93 being rigidly secured to the beveled pinion 114 follows its motion thus displacing the contact segments 94 and 95, which, when they engage with the contact arm 90, operate the solenoids 43 and 44 to control the flow of compressed air to the cylinder 30, thus causing the rudder 11 to steer the movable body 10 upon a predetermined curved course 250, as shown in Fig. 5; thus curve 250 being dependent upon the shape of the cam groove 153. The effect of rotating the arm 117 through any given angle is, therefore, the same as though the gyroscope 143 were rotated through twice that angle and in the opposite direction. Thus by moving the arm 117 through various arcs and at various rates the effect produced on the movable body 10 is the same as if the gyroscope or other stabilizing means which normally holds the movable body upon a predetermined course had been rotated through twice the angle and in the opposite direction.

Having thus described my invention, I claim:

1. In a direction control system, the combination of a movable body, steering means for said body, means for automatically maintaining said body on a predetermined course, means operable from a distance for varying the direction of said body at will, and means for causing said body to travel an irregular predetermined course.

2. In a direction control system, the combination of a movable body, steering means for said body, means automatically operative for actuating said steering means to cause said body to travel an irregular predetermined course, and means responsive to radiant energy for rendering said second means either effective or non-effective to actuate said steering means.

3. In a direction control system, the combination of a movable body, steering means for said body, means including a cam automatically operative for actuating said steering means to cause said body to travel an irregular predetermined course, and means responsive to radiant energy for rendering said second means either effective or non-effective to actuate said steering means.

4. In a direction control system, the combination of a movable body, steering means for said body, means automatically operative for actuating said steering means to cause said body to travel an irregular predetermined course, radiant energy means for varying the course of said body at will, and means for rendering said actuating means ineffective when said radiant energy means is operating.

5. In a direction control system, the combination of a movable body, steering means for said body, means including a cam for actuating said steering means to cause said body to travel an irregular predetermined course, means to rotate said cam, and means operative in response to radiant energy at any time after said body begins its movement for starting said rotating means.

6. In a direction control system, the combination of a movable body, steering means for said body, means including a cam for actuating said steering means to cause said body to travel an irregular course, a time controlled mechanism for operating said cam, and means controlled from a distance for rendering said time controlled mechanism ineffective.

7. In a direction control system, the combination of a movable body, steering means for said body, means including a cam for actuating said steering means to cause said body to travel an irregular course, a time controlled mechanism for operating said cam, and means controlled from a distance for rendering said time controlled mechanism ineffective and simultaneously resetting said mechanism.

8. In a direction control system, the combination of a movable body, steering means for said body, means for actuating said steering means to cause said body to travel an irregular course, a time controlled mechanism for operating said actuating means, means controlled from a distance for moving said steering means at will, and means operated by said distant control means for rendering said time mechanism ineffective when said body is under distant control.

9. In a direction control system, the combination of a movable body, steering means for said body, means for actuating said steering means to cause said body to travel an irregular course, a time controlled mechanism for operating said actuating means, radiant energy means for moving said steering means at will, and means operated by said radiant energy means for rendering said time mechanism ineffective when said body is under distant control.

10. In a direction control system, the combination of a movable body, steering means for said body, a plurality of direction control devices arranged to operate said steering means, and means operative in response to radiant energy to select any one of said control devices to actuate said steering means in a predetermined manner, one of said control devices being arranged to cause said body to be steered upon a substantially straight course, and another of said devices being arranged to cause said body to be steered upon an irregular course.

11. In a directive system, the combination with a body rotatable about a given axis, of stabilizing means automatically operative to stabilize said body with respect to said axis means carried by said body and automatically operative to vary the action of said stabilizing means upon said body and to cause said body to be rotated in a predetermined manner about said axis while under the influence of said stabilizing means, one of said control devices being arranged to cause said body to be steered upon a substantially straight course and another of said devices being arranged to cause said body to be steered upon a predetermined irregular course.

12. In a directive system, the combination with a body rotatable about a given axis, of stabilizing means automatically operative to stabilize said body with respect to said axis means carried by said body and automatically operative to modify the action of said stabilizing means upon said body and to cause said body to be rotated in a predetermined manner about said axis while under the influence of said stabilizing means, and means responsive to radiant energy for rendering said second mentioned means ineffective and for selectively rotating said body about said axis.

13. In a directive system, the combination with a body rotatable about a given axis, of stabilizing means automatically operative to stabilize said body with respect to said axis, means carried by said body and automatically operative to vary the action of said stabilizing means upon said body and thus cause the body to be oscillated to and fro in a predetermined manner about said axis while under the influence of said stabilizing means and means responsive to radiant energy for rendering said second mentioned means either operative or inoperative to control said stabilizing means.

14. In a directive system, the combination with a body rotatable about a given axis, of stabilizing means automatically operative to stabilize said body with respect to said axis, means carried by said body and automatically operative to modify the action of said stabilizing means upon said body and thus cause the body to be oscillated to and fro in a predetermined manner about said axis while under the influence of said stabilizing means and means responsive to radiant energy for rendering said second mentioned means either operative or inoperative to control said stabilizing means.

15. In a directive system, the combination with a body rotatable about a given axis, of stabilizing means carried by said body for stabilizing said body about said axis including an element normally held against rotation in space about a given axis, a second element rotatable with respect to said first mentioned element about said second mentioned axis and means automatically operative to swing said first mentioned element, an element responsive to energy impulses and means controlled by said element for rendering ineffective said first mentioned means and rotating said body selectively in either direction about said first mentioned axis.

16. The combination with a dirigible body, of stabilizing means carried thereby and automatically operative to stabilize said body with respect to a given axis, course varying means automatically operative to vary the action of said stabilizing means and to vary the course of said body at predetermined times, timing means carried by said body and automatically operative for initiating the action of said course, and means responsive to radiant energy for initiating the actions of said timing means.

17. The combination with a dirigible body, of stabilizing means carried thereby and automatically operative to stabilize said body with respect to a given axis, course varying means automatically operative to vary the action of said stabilizing means and to vary the course of said body at predetermined times, timing means carried by said body and automatically operative at a substantially constant predetermined rate for initiating the action of said course varying means, an element responsive to impulses of radiant energy and means controlled by said element for varying the action of said stabilizing means and steering said body selectively.

18. The combination with a body rotatable about a given axis of means carried thereby for rotating said body about said axis including two separately rotatable elements, means for transmitting rotary motion from one of said elements to the other of said elements including a member rotatable about a given axis and also rotatable about an axis perpendicular to said given axis, stabilizing means automatically operative to hold one of said elements against rotation in space about a given axis and means operative to rotate said member about said second mentioned axis to cause a relative rotation between said elements.

19. The combination with a body rotatable about a given axis of means carried thereby for rotating said body about said axis including two separately rotatable elements, means for transmitting rotary motion from one of said elements to the other of said elements including a member rotatable about a given axis and also rotatable about an axis perpendicular to said given axis, stabilizing means automatically operative to hold one of said elements against rotation in space about a given axis and means automatically operative to rotate said member about said second mentioned axis to cause a relative rotation between said elements.

20. The combination with a dirigible body, of means for controlling the direction of movement of said body including two beveled pinions rotated about a common axis, a beveled gear engaging both of said elements and rotatable about said common axis and also rotatable about a second axis perpendicular to said common axis, means operative to rotate said gear about said common axis, and stabilizing means automatically operative to hold one of said pinions against rotation in space about said common axis.

21. The combination with a dirigible body, of means for controlling the direction of movement of said body including two beveled pinions rotatable about a common axis, a beveled gear engaging both of said elements and rotatable about said common axis and also rotatable about a second axis perpendicular to said common axis, means automatically operative to rotate said gear about said common axis, and stabilizing means automatically operative to hold one of said pinions against rotation in space about said common axis.

22. The combination with a movable body provided with an element arranged to oscillate with respect thereto to determine the direction of movement of said body, fluid actuated means arranged to oscillate said element, electro-magnetic means arranged to control said fluid actuated means, means automatically operative to control said electro-magnetic means including a pair of electrical conducting members separately rotatable about a common axis and provided with electrical contacts, one of said members being operatively connected to said element to be oscillated about said axis as a result of the oscillation of said element, stabilizing means automatically operative to hold the other of said members against rotation in space about said axis and course varying means automatically operative to vary the action of said stabilizing means upon said other member and to rotate said other member in space about said axis.

23. The combination with a movable body provided with an element arranged to oscillate with respect thereto to determine the direction of movement of said body, fluid actuated means arranged to oscillate said element, electro-magnetic means arranged to control said fluid actuated means, means automatically operative to control said electro-magnetic means including a pair of electrical conducting members separately rotatable about a common axis and provided with electrical contacts, one of said members being operatively connected to said element to be oscillated about said axis as a result of the oscillation of said element, stabilizing means automatically operative to hold the other of said members against rotation in space about said axis, course varying means automatically operative to vary the action of said stabilizing means upon said other member and to rotate said other member in space about said axis and means responsive to radiant energy for overcoming the action of said stabilizing means and said course varying means and controlling said electro-magnetic means to rotate said body selectively either in one direction or in an opposite direction.

24. The combination with a dirigible body of means carried thereby and responsive to radiant energy for selectively controlling the direction of movement of said body and means under the control of said first mentioned means, and automatically operative to cause said body to proceed upon a course varied in direction at predetermined times in a predetermined manner.

25. The combination with a dirigible body of means carried thereby, and responsive to radiant energy for selectively controlling the direction of movement of said body and means under the control at all times of said first mentioned means, and automatically operative to cause said body to proceed upon a course varied in direction at predetermined times in a predetermined manner.

26. The combination with a dirigible body of means carried thereby and responsive to radiant energy, for selectively controlling the direction of movement of said body, course varying means carried by said body and automatically operative for causing said body to proceed upon a course varied in direction at predetermined times in a predetermined manner, and timing means controlled by said first mentioned means for initiating the operation of said second mentioned means.

27. In a directive system, the combination with a body rotatable about a given axis, of stabilizing means automatically operative to stabilize said body with respect to said axis, means carried by said body and automatically operative to vary the action of said stabilizing means upon said body and thus cause said body to be rotated in a predetermined manner about said axis while under the influence of said stabilizing means, timing means automatically operative to initiate the action of said second mentioned means, and means responsive to radiant energy and operative to initiate the action of said timing means.

28. In a directive system, the combination with a body rotatable about a given axis, of stabilizing means automatically operative to stabilize said body with respect to said axis, means carried by said body and automatically operative to vary the action of said stabilizing means upon said body and thus cause said body to be rotated in a predetermined manner about said axis while under the influence of said stabilizing means, timing means automatically operative to initiate the action of said second mentioned means, and means responsive to radiant energy and operative to initiate the action of said timing means, said timing means including an element movable from an initial position into an operative position, means for moving said element from said inoperative position into said operative position in response to an impulse of radiant energy, and means automatically operative to return said element into said inoperative position upon the cessation of said impulse.

29. The combination with a dirigible body, of steering means carried thereby, and controlling means for said steering means including a gyroscope, course varying means automatically operative to vary the action of said gyroscope, timing means for rendering said course varying means operative or inoperative, receiving means responsive to radiant energy for controlling said controlling means, said first mentioned controlling means being operative under the control of said receiving means either to steer said body selectively in one direction or in an opposite direction or to cause said body to be steered at any time at the will of an operator either upon a substantially straight course under the control of said gyroscope or upon a predetermined irregular course under the control of said course varying means and said timing means.

30. A system for the control of moving bodies, including in combination a body to be propelled, steering means thereon, means active upon said steering means to maintain a predetermined irregular direction of bodily movement of said body, and means under the control of the sender of the moving body to render said maintaining means active.

31. A system for the control of moving bodies including in combination a body to be propelled, steering means thereon, means active upon said steering means to maintain an irregular bodily movement of said body, and means under predetermined external control independent of the body's travel to effect or modify the action of said direction maintaining means.

Signed at Gloucester, county of Essex, State of Massachusetts, the 5th day of August, 1920.

JOHN HAYS HAMMOND, Jr.